United States Patent [19]
Thurston et al.

[11] 3,880,126
[45] Apr. 29, 1975

[54] SPLIT CYLINDER ENGINE AND METHOD OF OPERATION

[75] Inventors: Kelly W. Thurston; John H. Lundy, both of Okemos, Mich.

[73] Assignee: General Motors Corporation, Detroit, Mich.

[22] Filed: May 10, 1973

[21] Appl. No.: 358,836

[52] U.S. Cl............... 123/70 R; 123/65 VD
[51] Int. Cl............................................ F02b 33/22
[58] Field of Search........ 123/191 S, 191 SP, 32 SP, 123/65 VD, 75 B, 139 AJ, 70 R

[56] References Cited
UNITED STATES PATENTS

| | | | |
|---|---|---|---|
| 906,345 | 12/1908 | Williams | 123/191 S |
| 1,091,389 | 3/1914 | Reese et al. | 123/65 VD |
| 1,666,384 | 4/1928 | Hult | 123/75 R |
| 1,793,975 | 2/1931 | St. Clair | 123/70 R |
| 1,892,124 | 12/1932 | Abell | 123/75 B |
| 2,175,463 | 10/1939 | Haring | 123/75 B |
| 2,269,948 | 1/1942 | Mallory | 123/53 A |
| 2,383,336 | 8/1945 | Moore | 123/70 R |
| 2,522,649 | 9/1950 | Tenney | 123/70 R |
| 2,646,026 | 7/1953 | Jalbert | 123/75 B |
| 3,425,403 | 2/1969 | May | 123/139 AJ |
| 3,623,463 | 11/1971 | De Vries | 123/70 R |
| 3,675,630 | 7/1972 | Stratton | 123/70 R |
| 3,774,581 | 11/1973 | Lundy | 123/70 R |

FOREIGN PATENTS OR APPLICATIONS

| | | | |
|---|---|---|---|
| 1,038,342 | 9/1953 | France | 123/70 R |

*Primary Examiner*—Charles J. Myhre
*Assistant Examiner*—Tony Argenbright
*Attorney, Agent, or Firm*—Robert J. Outland

[57] ABSTRACT

A two-stroke cycle split cylinder internal combustion engine includes in preferred form interconnected induction and power cylinders having pistons phased and valves controlled to follow a cycle including drawing in and compressing a charge in the induction cylinder, transferring the charge to the power cylinder for mixture in part with retained exhaust products and further compressing the combined charge in the power cylinder, igniting a relatively undiluted portion of the combined charge and burning the charge, expanding the power cylinder to produce power and reducing the pressure of burned products in the expanded cylinder by exhausting a substantial portion thereof, leaving a retained charge of burned products at substantially the pressure existing in the engine exhaust system for subsequent mixing with a new charge from the induction cylinder.

10 Claims, 8 Drawing Figures

3,880,126

SPLIT CYLINDER ENGINE AND METHOD OF OPERATION

BACKGROUND OF THE INVENTION

This invention relates to split cylinder internal combustion engines and, more particularly, to engine arrangements for providing combustion of a charge including a high percentage of burned residuals with minimum cooling of the combustion cylinder walls to obtain desirable exhaust emission characteristics.

SUMMARY OF THE INVENTION

The present invention combines certain advantages of previously known split cylinder engines with conventional construction features of current engines and novel combustion chamber and valve timing arrangements in order to provide a two-stroke cycle split cylinder engine arranged for low emissions of hydrocarbons and nitrogen oxides in the exhaust gases.

This result is obtained by providing interconnected pairs of cylinders with the pistons operating out of phase; the piston of one cylinder, called the induction cylinder, preferably moving somewhat less than one-half stroke in advance of the piston of the second cylinder, called the power cylinder. The induction cylinder is arranged to receive and compress a charge, which is subsequently transferred to the power cylinder, where it is mixed with a retained residual charge of burned products from the previous cycle.

The combined charge is further compressed, ignited by a spark plug, burned and expanded to produce power. The spark plug is located in a zone adjacent the transfer valve between the cylinders, where a relatively undiluted portion of air-fuel mixture is available for easy ignition of the compressed charge. Near the conclusion of the power stroke, the exhaust valve is opened, allowing burned exhaust gases to escape until the pressure in the cylinder is reduced to about that of the exhaust system. The exhaust valve is then closed, leaving a retained charge of burned gases in the power cylinder for compression and mixing with a subsequent partially compressed charge from the induction cylinder. The cycle is then repeated.

By providing a substantial dilution of the combustion charge with as much as 50 percent or more of burned gases, combustion temperatures are limited, reducing the formation of oxides of nitrogen in the burning process. Furthermore, because the walls of the power cylinder are not exposed to cool incoming mixtures, the surface temperatures are elevated and quenching of combustion with its resultant formation of residual hydrocarbons along the wall surfaces is reduced. Further control of hydrocarbons, as well as carbon monoxide, may be obtained through operating with an overall lean air-fuel ratio or, in any other known manner, such as by the addition of converter or reactor devices in the exhaust system.

These and other advantages of the invention will be more fully understood from the following description of certain preferred embodiments, taken together with the accompanying drawings.

DESCRIPTION OF THE ILLUSTRATED EMBODIMENTS

Figure 1:
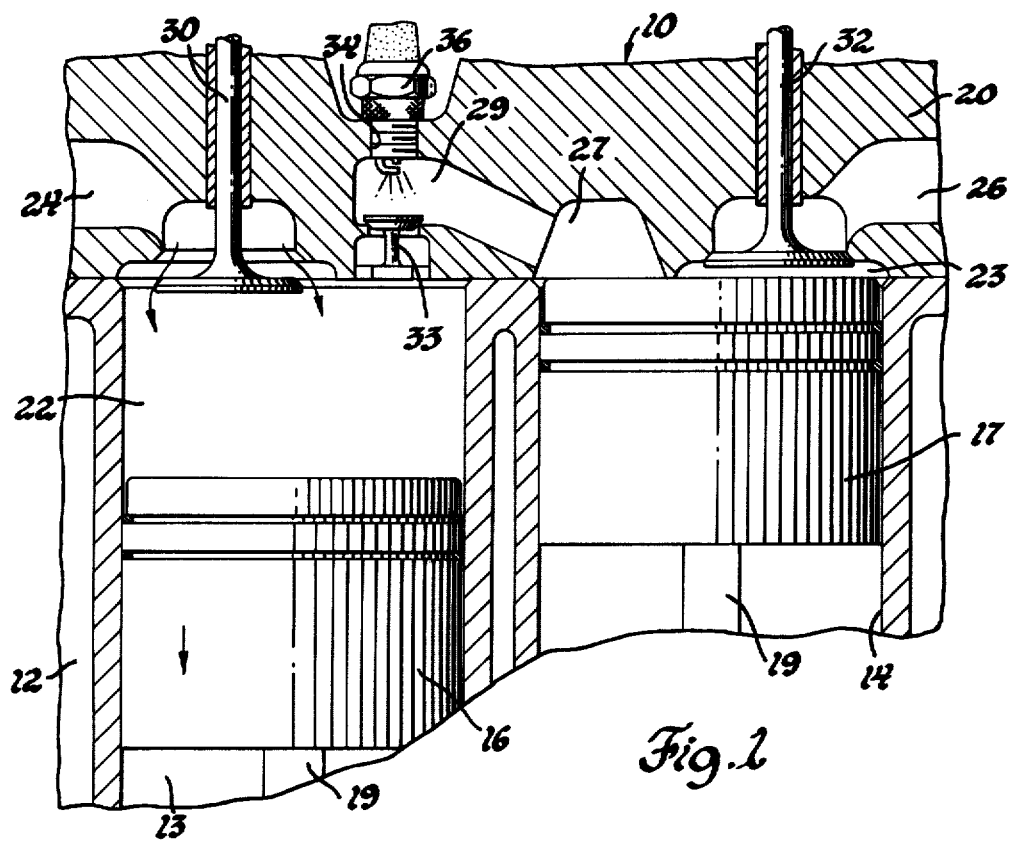
FIGS. 1 – 4 are cross-sectional views of a portion of an internal combustion engine formed according to the invention, illustrating diagrammatically the operation of the engine during various events of an operating cycle.

FIGS. 1 – 4 of the drawings illustrate diagrammatically one embodiment of the invention in the form of a split cylinder two-cycle internal combustion engine generally indicated by numeral 10.

Engine 10 includes a cylinder block 12 having a plurality of cylinders arranged in pairs, each pair including an induction cylinder 13 and a power cylinder 14. A piston 16 is reciprocably disposed in each induction cylinder 13 and a piston 17 is likewise disposed in each power cylinder 14, the pistons being connected by connecting rods 19 to a crankshaft, not shown. The throws of the crankshaft are arranged such that the induction pistons 16 are phased to move in advance of the power pistons 17 by 90 crankshaft degrees, which is equal to one-half the piston stroke or one-quarter cycle of the engine. This phasing may, if desired, be varied within a range of from somewhat less than one-half cycle to nearly in phase.

Engine 10 further includes a cylinder head 20 closing the ends of the cylinders 13, 14 and defining with the pistons 16, 17 variable volume induction and power chambers 22 and 23, respectively. Cylinder head 20 includes an inlet port 24 connecting chamber 22 with a carburetor, not shown, for supplying a combustible air-fuel mixture thereto. An exhaust port 26 is also provided, connecting chamber 23 with a suitable exhaust system, not shown. A combustion chamber 27 is defined by a recess in cylinder head 20 which extends from chamber 23 and forms an extension of a transfer passage 29, connecting with chamber 22 of the induction cylinder.

Poppet valves 30, 32 and 33 are provided to control the passage of gases, respectively, through ports 24 and 26 and transfer passage 29. All the valves may be mechanically actuated in conventional fashion by suitable means, not shown, or valves 30 and/or 33 may be pressure actuated. In the embodiment of FIGS. 1 – 4, valves 30 and 32 are preferably mechanically actuated and valve 33 is pressure actuated. An opening 34 is provided in the cylinder head to receive a spark plug 36 which extends into the transfer passage 29 near the transfer valve 33 for a purpose to be subsequently described.

The operation of the above described embodiment is as follows. Inlet valve 30 opens upon the beginning of the downward motion of piston 16 on its intake stroke to permit induction of a combustible charge of fuel-air mixture into the chamber 22. As piston 16 reaches the halfway point on its induction stroke, as shown in FIG. 1, piston 17 has reached the highest point in its compression stroke, compressing the charge previously formed therein. At about this point, spark plug 36 is fired, igniting relatively undiluted mixture in the transfer passage adjacent transfer valve 33 and initiating combustion of the cylinder charge.

Figure 2:
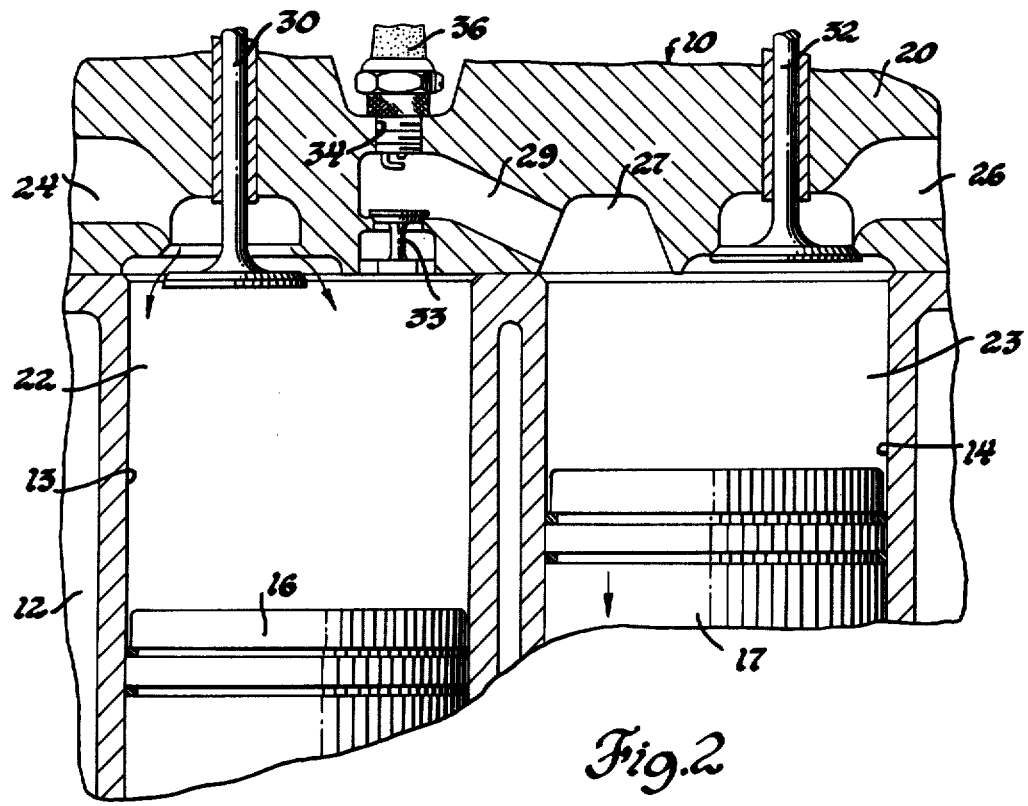

The increasing pressure of the cylinder charge in chamber 23 forces piston 17 downwardly as combustion of the charge is completed and the burned gases expand. In FIG. 2, this expansion has reached about the halfway point, while piston 16 has completed its induction stroke and intake valve 30 will shortly close.

Figure 3:
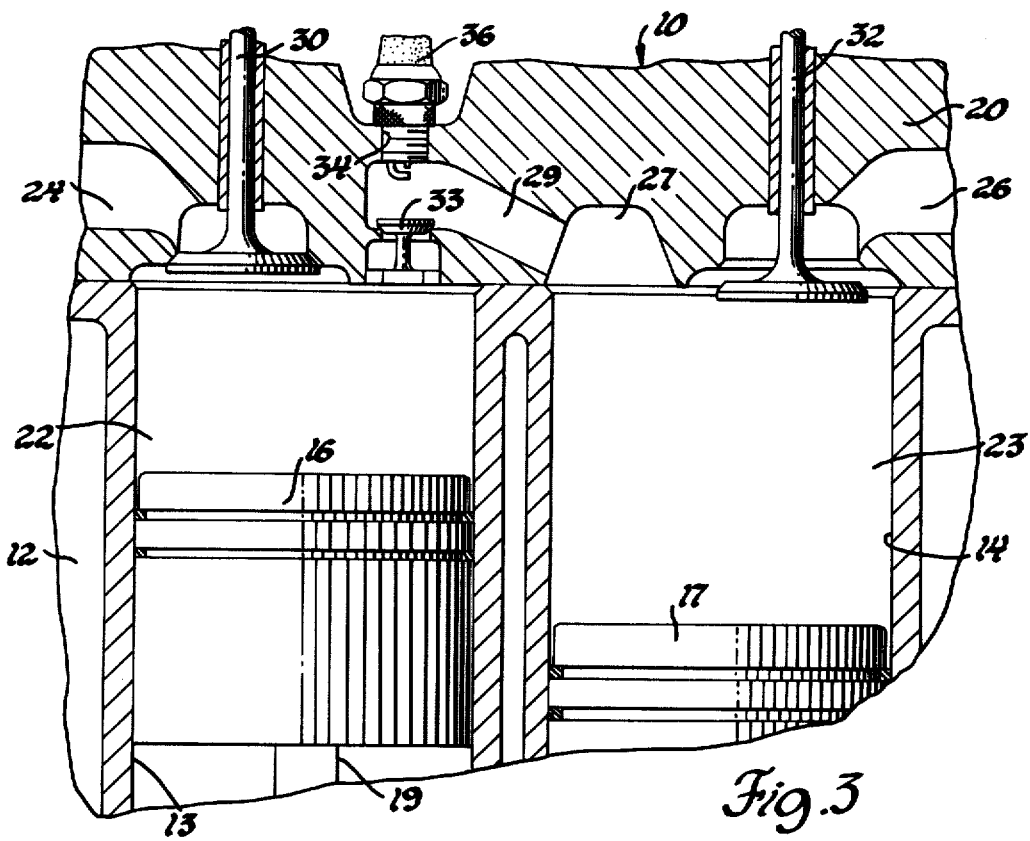

Piston 16 then begins to move upwardly on its compression stroke, while piston 17 continues to move downwardly toward its lowest position, as shown in FIG. 3. Somewhat before this point, the end of the expansion stroke, exhaust valve 32 is opened, allowing blowdown of the exhaust gases into the exhaust system through port 26 until the cylinder pressure in chamber 23 is reduced to about the pressure of the exhaust system. In the meantime, the combustible charge in chamber 22 has been compressed to approximately half its volume, as shown in FIG. 3.

Figure 4:
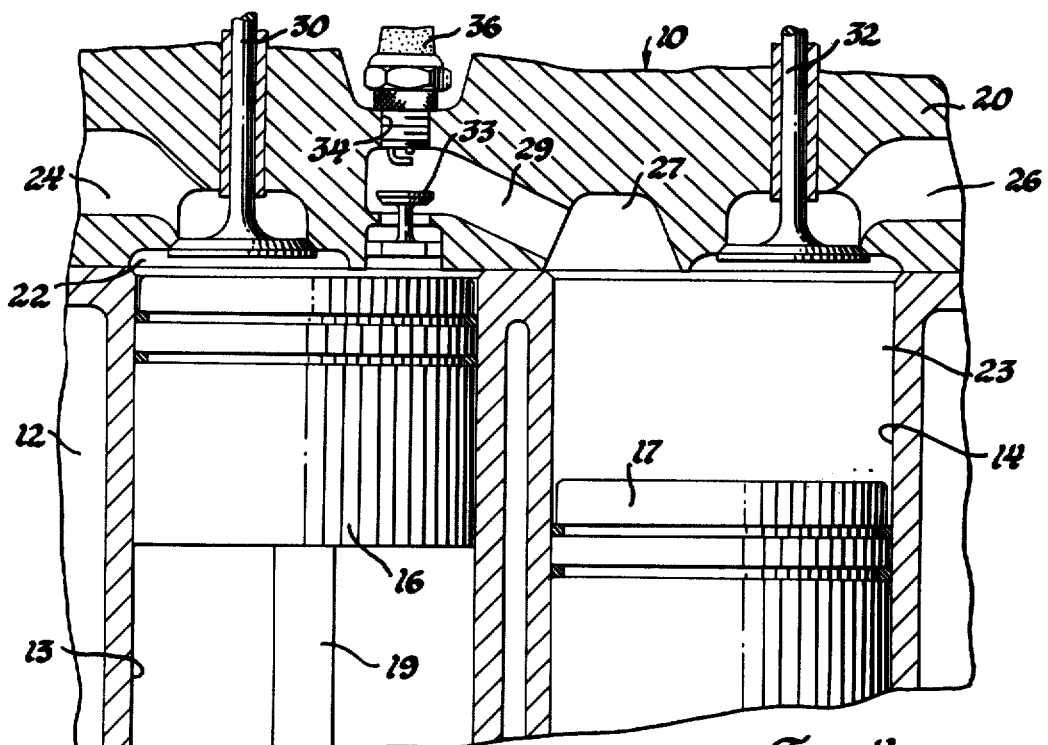

When the pressure in chamber 23 drops below that in chamber 22 sufficiently to overcome the inertia of valve 33 (which may, if desired, be provided with a spring to increase the differential pressure required), valve 33 opens, permitting the compressed mixture in chamber 22 to pass into the transfer passage 29, combustion chamber 27 and chamber 23. The exhaust valve 32 is timed to close early in the upward compression stroke of the power piston 17, before any substantial part of the fresh mixture is lost through the exhaust port 26. This early closing of the exhaust valve traps a large amount of residual burned gases in chamber 23. Further upward movement of both pistons 16 and 17 continues the transfer of compressed fresh mixture to the power cylinder chamber 23, while further compressing the combined fresh mixture and burned gases until piston 16 reaches the uppermost point in its travel, as shown in FIG. 4. At this point, nearly all of the combustible mixture has been forced out of chamber 22 and is either in the transfer passage or beginning to mix with the retained burned gases in the chamber 23 and combustion chamber 27.

At this point, piston 16 reverses directions, while piston 17 continues upwardly, further compressing the combined mixture and allowing valve 33 to close, preventing the return of mixture to chamber 22. Downward movement of piston 16 combined with the simultaneous opening of inlet valve 30, permits a new combustible charge to be drawn into chamber 22 in a repetition of the previous cycle, while piston 17 moves to its highest point, compressing the mixture to the point shown in FIG. 1, where the previously described combustion and expansion steps are repeated.

It should be noted that the compressed mixture resulting in chamber 23 at the time of ignition, as indicated in FIG. 1, consists of a substantial body of retained burned gases, in part intermixed with the fresh mixture but generally concentrated in the portions of the chamber away from the transfer passage 29. The transfer passage itself forms a zone of relatively undiluted mixture, including the last transferred parts of the mixture received from chamber 22 past valve 33. This relatively undiluted mixture is easily ignitable by the spark plug 36 when it is fired and it is for this reason that the spark plug is placed in a position close to the transfer valve 33.

In view of the high retention of burned gas residuals in chamber 23 and the mixture of these gases with the fresh charge transferred from chamber 22 before and during combustion, the combustion temperatures are limited so as to minimize the amount of nitrogen oxides formed in the combustion process. In addition, the temperatures of the cylinder and combustion chamber walls are maintained at a relatively high level, since they are never contacted by the cool air-fuel charge which is admitted to and compressed in chamber 22. Accordingly, emissions of both oxides of nitrogen and hydrocarbons are maintained at low levels. Further control of carbon monoxide may be attained by operating the engine at as lean an air-fuel ratio as practicable, as well as by using supplemental air in known manner in the cylinder or the exhaust system.

While the arrangement of FIGS. 1 – 4 as described utilizes a carburetor to supply a mixture of air and fuel to the induction cylinder inlet port, it would be equally possible to use fuel injection means. Such fuel injection means could supply fuel to the air either before admission to the induction cylinder or during or after the transfer process from the induction cylinder, either before or after the transfer valve in the transfer passage. In the latter instances, problems of condensation of fuel in the induction cylinder would be avoided at the expense of added problems in assuring the mixing of the air and fuel to form an easily ignitable and combustible charge.

Figure 4A:
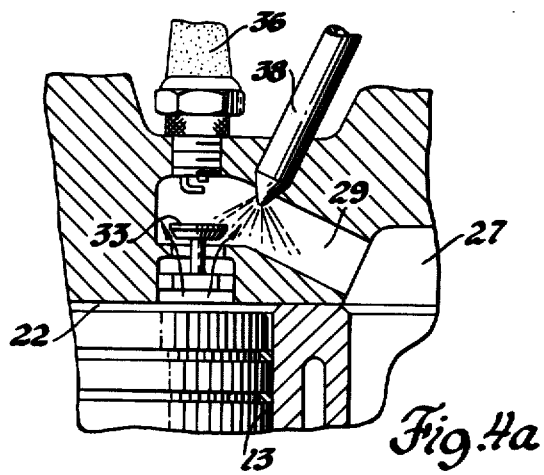
FIG. 4a is a cross-sectional view similar to FIG. 4 but showing a modified embodiment of the engine.

FIG. 4a illustrates a modification of the arrangement of FIGS. 1 – 4 to include a fuel injector 38 for the direct injection of fuel into the transfer passage 29 to mix with a partially compressed charge of air being transferred from the induction cylinder 13.

Figure 6:
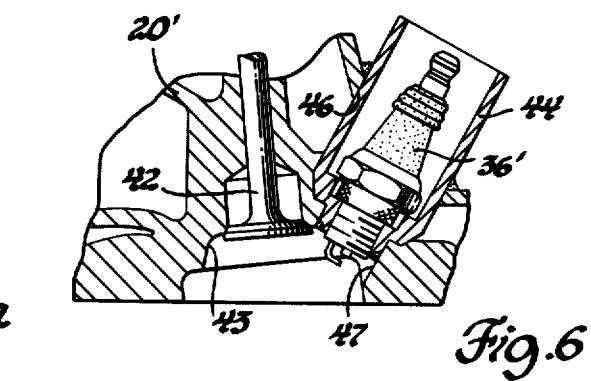
FIG. 6 is a cross-sectional view of the cylinder head assembly of FIG. 5 taken generally in the plane indicated by the Line 6—6.
Figure 5:
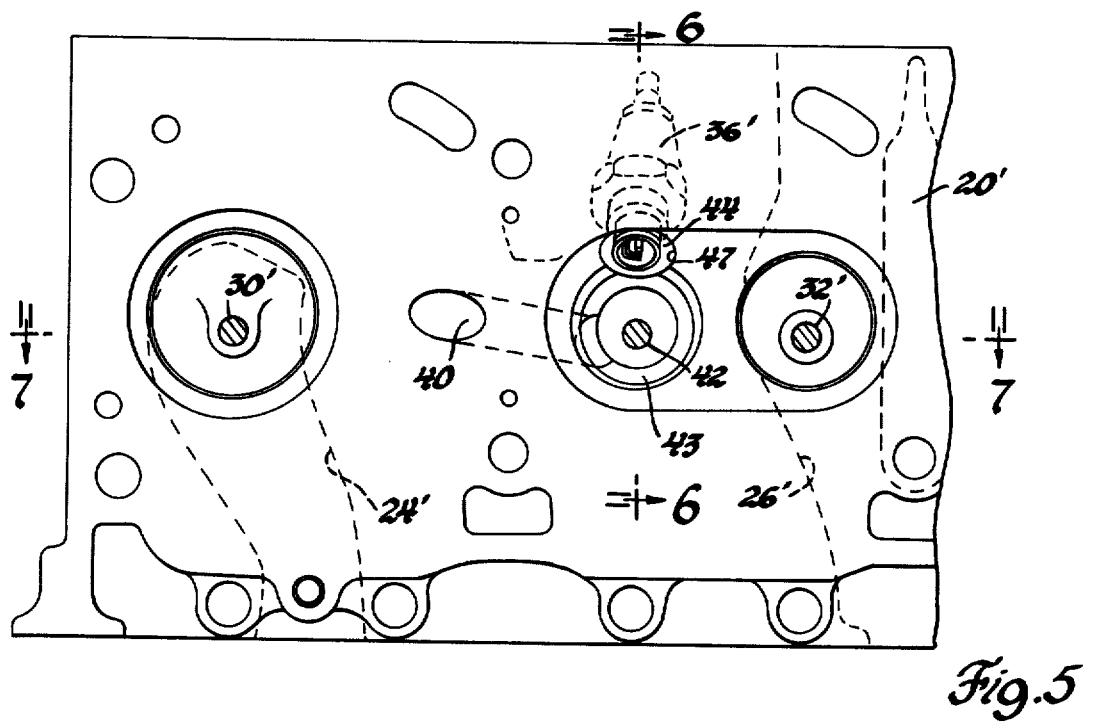
FIG. 5 is a lower plan view of a portion of an engine cylinder head assembly arranged for use on a V–8 engine of conventional cylinder arrangement and illustrating an alternative embodiment of the invention based upon modifications of the conventional cylinder head design.
Figure 7:
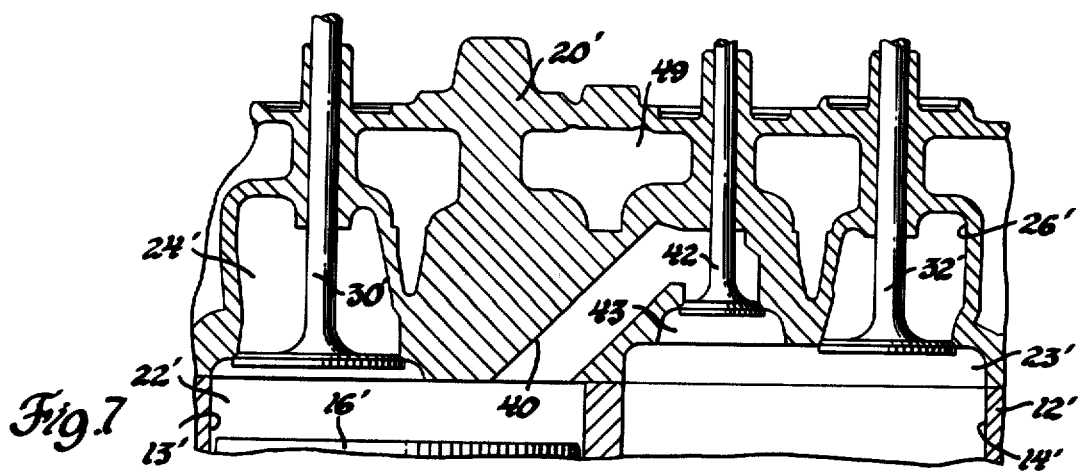
FIG. 7 is the cross-sectional view of the cylinder head of FIGS. 5 and 6 taken generally in the plane indicated by the Line 7—7 of FIG. 5 and shown assembled in an engine.

FIGS. 5 – 7 illustrate an alternative embodiment of the invention having many equivalent components to the arrangement of FIGS. 1 – 4, but wherein the design of the transfer passage and combustion chamber are modified. To simplify the description, primed reference numerals are used for parts corresponding to those of the first described embodiment.

As is best shown in FIG. 7, the transfer passage 40 connects directly with chamber 22' of cylinder 13', a transfer valve 42 being located adjacent the opposite end of the transfer passage, where it opens into a recessed combustion chamber 43, which forms an extention of the transfer passage and opens into the power chamber 23'. The spark plug 36' is mounted, as best shown in FIG. 6, in an adapter 44. The adapter is in turn secured, by welding, in openings 46 and 47 provided in the outer and inner walls, respectively, of the cylinder head and extends through the water jacket 49. The terminals of the spark plug 36' extend into the upper portion of the combustion chamber 43 adjacent the transfer valve 42. In this arrangement, the transfer valve 42 is mechanically actuated, as are the inlet and exhaust valves 30' and 32', respectively.

The operation of the alternative embodiment is generally the same as that previously described except that transfer valve 42 is mechanically actuated in timed relationship to the other valves and is arranged so that there is no significant overlap between its opening period and that of the exhaust valve 32'. This prevents any substantial transfer of fresh mixture entering through the transfer valve directly out the exhaust valve.

The relatively long transfer passage 40 between the induction cylinder 13' and the transfer valve 42 has a tendency to reduce slightly the volumetric efficiency of the cylinder, since a certain percentage of the compressed gases are retained in the transfer passage each stroke. The compression work in these gases may, however, be recovered during the downward stroke of the induction piston 16' by delaying the opening of the inlet valve 30' until the residual compressed gases have expanded to atmospheric pressure.

The location of the transfer valve close to the power chamber 23' likewise reduces the ability to maintain a segregated relatively undiluted mixture adjacent the spark plug for ignition. This capability is, however, aided by placing the spark plug immediately adjacent the transfer valve and by the provision of the recessed combustion chamber 43. Some dilution of burned gases in the mixture surrounding the spark plug may be permitted, however, without destroying the ability of the mixture to fire, as long as the dilution does not become excessive. In view of the large percentage of the burned gases retained in the present system, it is necessary that some stratification or variation in the amount of dilution throughout the cylinder be maintained, with the mixture adjacent the spark plug at the end of the compression stroke being less diluted than the remaining mixture.

The arrangement of the transfer valve in the alternative embodiment has the advantage that conventional mechanical means may be utilized for its operation. If desired, however, other types of mechanisms could be utilized to mechanically actuate a transfer valve placed closer to the induction cylinder in the transfer passage.

While the invention has been described by reference to certain specific embodiments, it should be recognized that numerous changes could be made within the scope of the inventive concepts disclosed. Accordingly, the invention is intended to be limited only in accordance with the following claims.

We claim:

1. A two-stroke cycle split cylinder internal combustion engine comprising
    a cylinder block having a pair of adjacent cylinders consisting of an induction cylinder and a power cylinder,
    a cylinder head closing adjacent ends of said cylinders and having an inlet port to said induction cylinder, an exhaust port from said power cylinder and a transfer passage between said cylinders,
    pistons in said cylinders and arranged for reciprocation in predetermined timed relation, with the piston of said induction cylinder leading the piston of said power cylinder by less than one stroke,
    said cylinder head mounting an inlet valve closing said inlet port and operable to admit an inlet charge to said induction cylinder, an exhaust valve closing said exhaust port and openable to allow escape of gases from said power cylinder and a transfer valve closing said transfer passage intermediate said induction and power cylinders and openable to permit the flow of gases from said induction cylinder to said power cylinder, and
    spark ignition means in a portion of said transfer passage between said transfer valve and power cylinder and closely adjacent said transfer valve, such portion of said transfer passage forming a recessed initial combustion chamber open to said power cylinder,
    said exhaust valve being actuated in timed relation to said engine pistons and being arranged to close sufficiently early in the compression stroke of the power piston to trap a relatively large volume of burned gases in said power cylinder for mixture with and dilution of part of the fresh gases transferred from said induction cylinder for combustion in said transfer passage and said power cylinder.

2. The engine of claim 1 wherein said transfer valve is pressure actuated to open when the pressure in said induction cylinder is higher than in said power cylinder, said exhaust valve being mechanically actuated and timed to close before a substantial amount of the mixture entering said power cylinder, past said transfer valve, is allowed to exit through said exhaust port.

3. The engine of claim 1 wherein said transfer valve is mechanically actuated in timed relation with the engine pistons, said transfer and exhaust valves being timed to prevent substantial direct passage of fresh mixture out through said exhaust valve.

4. The engine of claim 1 wherein said inlet valve is pressure-actuated to open when the pressure in said induction cylinder is lower than the charging pressure in said inlet port.

5. The engine of claim 1 wherein said inlet valve is mechanically actuated in timed relation to said engine pistons, said inlet valve being timed to open after the beginning of the induction piston intake stroke and to remain open for substantially the remainder of said sroke.

6. The engine of claim 1 and further including fuel injection means mounted in said cylinder head and arranged to inject fuel into said transfer passage for ignition and combustion with a charge of air therein.

7. The method of operating an internal combustion engine having induction and power expansible chambers connected by a transfer passage forming a recessed initial combustion chamber for said power chamber, said method comprising repetitively performing an operating cycle including the steps of:
    a. drawing a charge of air into said induction chamber by expansion thereof,
    b. partially compressing said air charge in said induction chamber by contraction thereof,
    c. transferring said air charge to said transfer passage and therethrough to said power chamber for mixture with retained burned gases from the previous cycle,
    d. further compressing said air charge through contraction of said power chamber,
    e. mixing fuel with said air charge to form a compressed combustible mixture,
    f. igniting said combustible mixture in said transfer passage for burning in said transfer passage and subsequently in said power chamber,
    g. expanding the burning and burned gases in said power chamber by expansion thereof with an output of useful work,
    h. exhausting a major portion of the burned gases from said power chamber by blowdown through exhaust port means,
    i. retaining a relatively large portion of the burned gases in said expansion chamber for recompression and mixing with the fresh charge to be supplied to said power chamber for burning on the subsequent cycle.

8. The method of claim 7 wherein said step of mixing fuel with said air charge is performed before said step of drawing said air charge into said induction chamber.

9. The method of claim 7 wherein said step (e) of mixing fuel with said air charge is performed during or subsequent to the transfer step (c) by injection of fuel directly into said transfer passage.

10. The method of claim 7 wherein said steps (c) and (d) of transferring and further compressing said charge occur in part simultaneously during contraction of both said induction and power chambers.

* * * * *